(12) United States Patent
Dai et al.

(10) Patent No.: US 9,637,351 B2
(45) Date of Patent: May 2, 2017

(54) CONVEYOR BAND DRIVE SYSTEM

(71) Applicant: Otis Elevator Company, Farmington, CT (US)

(72) Inventors: Du Dai, Shanghai (CN); Jian Cheng, Shanghai (CN); Yongbo Zhang, Hunan Province (CN); Fengshu Yue, Tianjin (CN); HuiSheng Zheng, Zhejiang Province (CN); Hongmin Zhu, Hebei Province (CN); Yongqing Chen, Shanghai (CN)

(73) Assignee: Otis Elevator Company, Farmington, CT (US)

( * ) Notice: Subject to any disclaimer, the term of this patent is extended or adjusted under 35 U.S.C. 154(b) by 0 days.

(21) Appl. No.: 14/903,954

(22) PCT Filed: Jul. 12, 2013

(86) PCT No.: PCT/CN2013/000846
§ 371 (c)(1),
(2) Date: Jan. 8, 2016

(87) PCT Pub. No.: WO2015/003288
PCT Pub. Date: Jan. 15, 2015

(65) Prior Publication Data
US 2016/0167929 A1    Jun. 16, 2016

(51) Int. Cl.
*B66B 23/02* (2006.01)
*B65G 23/06* (2006.01)
*B65G 23/24* (2006.01)

(52) U.S. Cl.
CPC ............ *B66B 23/026* (2013.01); *B65G 23/06* (2013.01); *B65G 23/24* (2013.01)

(58) Field of Classification Search
CPC ...... B66B 23/026; B65G 23/04; B65G 23/06; B65G 23/08; B65G 23/24; B65G 23/26; B65G 23/30
See application file for complete search history.

(56) References Cited

U.S. PATENT DOCUMENTS 4,100,822 A    7/1978 Rosman
4,775,044 A *  10/1988 Hofling ................. B66B 23/026
                                                    198/330

(Continued)

FOREIGN PATENT DOCUMENTS

| DE | 10136030 | 2/2003 |
| DE | 10136031 | 2/2003 |
| JP | 2001163562 | 6/2001 |

*Primary Examiner* — Mark A Deuble
(74) *Attorney, Agent, or Firm* — O'Shea Getz P.C.

(57) ABSTRACT

A drive system (10) that is operable to drive a conveyor band (12) includes a drive motor (26), inner and outer drive shafts (28, 30), a gearbox (32), and a band engagement member (34, 36). The inner drive shaft (28) includes first and second ends (38, 40), the first end (38) being connected to the drive motor (26). The gearbox (32) includes input and output portions, the input and output portions being in geared connection with one another, and the input portions being connected to the second end (40) of the inner drive shaft (28). The outer drive shaft (30) includes a cavity (46) that extends through at least a portion of the outer drive shaft (30). The outer drive shaft (30) is connected to the output portion of the gearbox (32). The band engagement member (34, 36) extends radially outward from an outer surface of the outer drive shaft (30). At least a portion of the inner drive shaft (28) is positioned within the cavity (46) of the outer drive shaft (30).

22 Claims, 8 Drawing Sheets

(56) References Cited

U.S. PATENT DOCUMENTS

| | | | |
|---|---|---|---|
| 5,224,580 A * | 7/1993 | Nurnberg | B66B 23/02 198/330 |
| 5,379,877 A | 1/1995 | Hoefling | |
| 5,437,585 A | 8/1995 | Sundseth | |
| 5,665,944 A | 9/1997 | Aulanko et al. | |
| 5,950,797 A * | 9/1999 | Aulanko | B66B 23/02 198/330 |
| 6,161,674 A | 12/2000 | Aulanko et al. | |
| 6,247,575 B1 | 6/2001 | Thiel | |
| 6,260,687 B1 * | 7/2001 | Ulrich | B66B 23/026 198/330 |
| 6,427,823 B1 | 8/2002 | Ishikawa et al. | |
| 6,640,959 B1 | 11/2003 | Haumann et al. | |
| 7,168,547 B2 | 1/2007 | Thaler et al. | |
| 7,357,240 B2 | 4/2008 | Ogimura et al. | |
| 7,451,867 B2 | 11/2008 | Berger et al. | |
| 7,597,182 B2 | 10/2009 | Illedits et al. | |
| 8,381,894 B2 | 2/2013 | Nurnberg et al. | |
| 2002/0148703 A1 * | 10/2002 | Ulrich | B66B 23/026 198/321 |
| 2006/0118392 A1 * | 6/2006 | El-Ibiary | B65G 23/08 198/781.03 |
| 2011/0024262 A1 * | 2/2011 | Nurnberg | B66B 23/026 198/330 |
| 2015/0101433 A1 * | 4/2015 | Collison | F16H 57/025 74/412 R |

* cited by examiner

CONVEYOR BAND DRIVE SYSTEM

This application claims priority to PCT Patent Application No. PCT/CN2013/000846 filed Jul. 12, 2013.

BACKGROUND

1. Technical Field

Aspects of the present invention relate to a drive system, and more particularly relate to a drive system that is operable to drive a conveyor band.

2. Background Information

It is known to provide a drive system that is operable to drive a conveyor band (e.g., a moving sidewalk band, an escalator step band) that is included in a passenger conveyance system (e.g., a moving sidewalk system, an escalator system). In some instances, the drive system can be relatively large in size, and thus can cause the passenger conveyance system to be larger in size than is desired. Aspects of the present invention are directed to this and other problems.

SUMMARY OF ASPECTS OF THE INVENTION

According to an aspect of the present invention, a drive system is provided that is operable to drive a conveyor band. The drive system includes a drive motor, an inner drive shaft, a gearbox, an outer drive shaft, and a band engagement member. The inner drive shaft includes a first end and a second end. The first end of the inner drive shaft is connected to the drive motor. The gearbox includes an input portion and an output portion. The input and output portions are in geared connection with one another. The input portion is connected to the second end of the inner drive shaft. The outer drive shaft includes a first end, a second end, and a cavity that extends through at least a portion of the outer drive shaft in a direction between the first and second ends. The outer drive shaft is connected to the output portion of the gearbox. The band engagement member is connected to the outer drive shaft. The band engagement member extends radially outward from an outer surface of the outer drive shaft. The band engagement member is operable to engage the conveyor band to transfer rotational energy from the outer drive shaft to the conveyor band. At least a portion of the inner drive shaft is positioned within the cavity of the outer drive shaft.

According to an alternative or additional aspect of the present invention, the conveyor band is an escalator step band that includes structure that enables a plurality of escalator steps to be attached thereto.

According to an alternative or additional aspect of the present invention, the band engagement member is a sprocket.

According to an alternative or additional aspect of the present invention, the band engagement member includes an annular base portion connected to an outer surface of the outer drive shaft, an annular web portion that extends radially outward from the base portion, and a plurality of teeth that extend radially outward from the base portion.

According to an alternative or additional aspect of the present invention, the drive system includes a first band engagement member and a second band engagement member, each are connected to the outer drive shaft, each extend radially outward from an outer surface of the outer drive shaft, and each are operable to engage the conveyor band to transfer rotational energy from the outer drive shaft to the conveyor band.

According to an alternative or additional aspect of the present invention, the conveyor band is an escalator step band onto which a plurality of escalator steps are attached; each of the first and second band engagement members is a sprocket; radially outer surfaces of the first and second band engagement members define a generally cylindrically-shaped area that extends between the first and second band engagement members; and each of the plurality of escalator steps is at least substantially disposed within the generally cylindrically-shaped area when a portion of the conveyor band that the respective escalator step is attached to is in engagement with the first and second band engagement members.

According to an alternative or additional aspect of the present invention, the inner drive shaft is positioned relative to the outer drive shaft such that the first end of the inner drive shaft is proximate the second end of the outer drive shaft.

According to an alternative or additional aspect of the present invention, the drive motor is a radial gap type electric motor.

According to an alternative or additional aspect of the present invention, the cavity of the outer drive shaft includes a first portion and a second portion, and the first portion has a first diameter and the second portion has a second diameter that is greater than the first diameter.

According to an alternative or additional aspect of the present invention, the inner drive shaft is positioned within the first portion of the cavity and the gearbox is positioned with the second portion of the cavity.

According to an alternative or additional aspect of the present invention, the gearbox is a planetary gearbox that includes a sun gear, a plurality of planet gears, a planet gear carrier, a ring gear, and a ring gear carrier.

According to an alternative or additional aspect of the present invention, the input portion of the gearbox is the sun gear, and the output portion of the planetary gearbox is the planet gear carrier.

According to an alternative or additional aspect of the present invention, the inner and outer drive shafts are concentrically positioned relative to a first axis.

According to an alternative or additional aspect of the present invention, the drive motor includes a stator that is positionally fixed, and a rotor that rotates relative to the stator; and the rotor is concentrically positioned relative to the first axis.

According to an alternative or additional aspect of the present invention, the inner drive shaft is concentrically positioned relative to a first axis; the outer drive shaft is concentrically positioned relative to a second axis; and the first and second axes are different.

According to an alternative or additional aspect of the present invention, a distance separates the inner drive shaft from an inner surface of the outer drive shaft that defines the cavity of the outer drive shaft.

According to an alternative or additional aspect of the present invention, a plurality of roller elements are positioned between the inner drive shaft and the outer drive shaft.

According to an alternative or additional aspect of the present invention, the inner drive shaft slidably engages the inner surface of the outer drive shaft that defines the cavity of the outer drive shaft.

According to an alternative or additional aspect of the present invention, the conveyor band includes a first end and a second end that are connected to form a continuous loop; and the drive motor is positioned inside the loop formed by the conveyor band.

According to an alternative or additional aspect of the present invention, the drive system further includes a first band engagement member and a second band engagement member; and the gearbox is positioned between the first and second band engagement members.

According to an alternative or additional aspect of the present invention, the drive system further includes an operation braking device that is operable to selectively aid in braking the band engagement member.

According to an alternative or additional aspect of the present invention, the operation braking device is operable to selectively aid in braking the band engagement member in response to a brake signal received from a controller.

According to an alternative or additional aspect of the present invention, the drive motor includes a stator that is positionally fixed, and a rotor that rotates relative to the stator; the operation braking device includes at least one brake shoe disposed relative to the rotor; and the operation braking device includes an actuator that is operable to selectively move the at least one brake shoe between a non-braking position, in which the at least one brake shoe does not contact an outer surface of the rotor, and a braking position, in which the at least one brake shoe frictionally engages the outer surface of the rotor.

According to an alternative or additional aspect of the present invention, the drive motor includes a stator that is positionally fixed, and a rotor that rotates relative to the stator; the operation braking device includes a first brake shoe and a second brake shoe, the first and second brake shoes being positioned proximate circumferentially opposite portions of the rotor; the operation braking device includes an actuator that is operable to selectively move the first and second brake shoes between a non-braking position, in which the first and brake shoes do not contact an outer surface of the rotor, and a braking position, in which the first and second brake shoes frictionally engage the outer surface of the rotor.

According to an alternative or additional aspect of the present invention, the operation braking device includes an actuator that is operable to selectively move a brake shoe between a non-braking position, in which the brake shoe does not contact a component in connection between the drive motor and the input portion of the gearbox, and a braking position, in which the brake shoe frictionally engages the component.

According to an alternative or additional aspect of the present invention, the drive system further includes an auxiliary braking device that is operable to selectively aid in braking the band engagement member.

According to an alternative or additional aspect of the present invention, the drive system further includes a controller; and the auxiliary braking device is operable to selectively aid in braking the band engagement member in response to a brake signal received from the controller.

According to an alternative or additional aspect of the present invention, the auxiliary braking device includes an actuator that is operable to selectively move a brake shoe between a non-braking position, in which the brake shoe does not contact a component in connection the output portion of the gearbox, and a braking position, in which the brake shoe frictionally engages the component.

DETAILED DESCRIPTION

Figure 1:
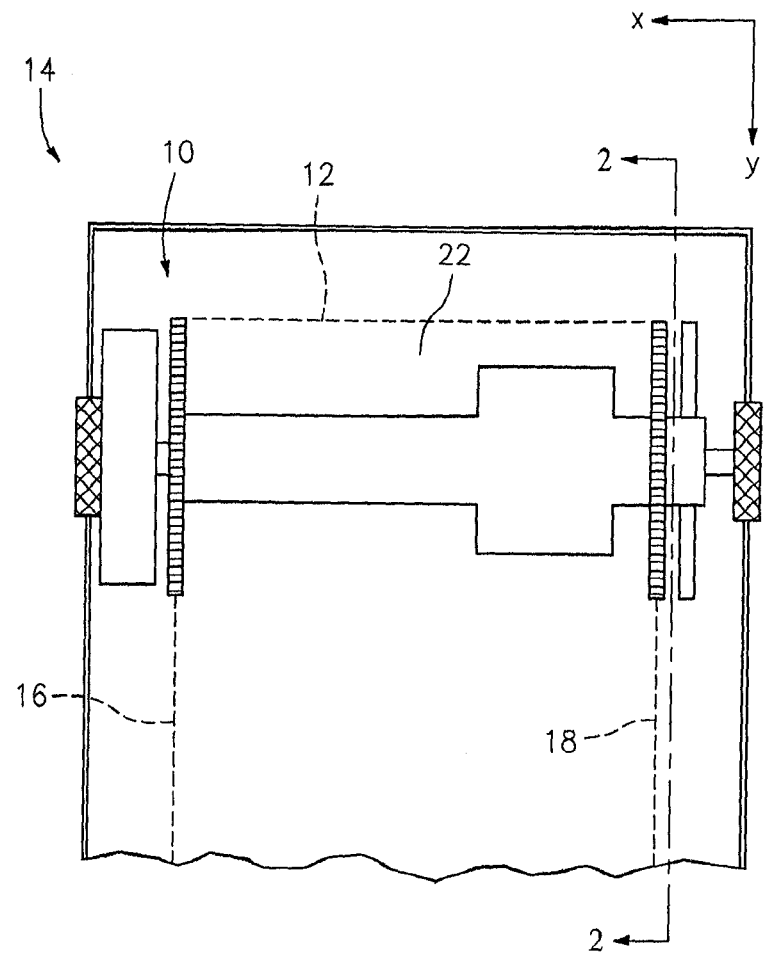
FIG. 1 is a schematic plan view of an escalator system.
Figure 2:
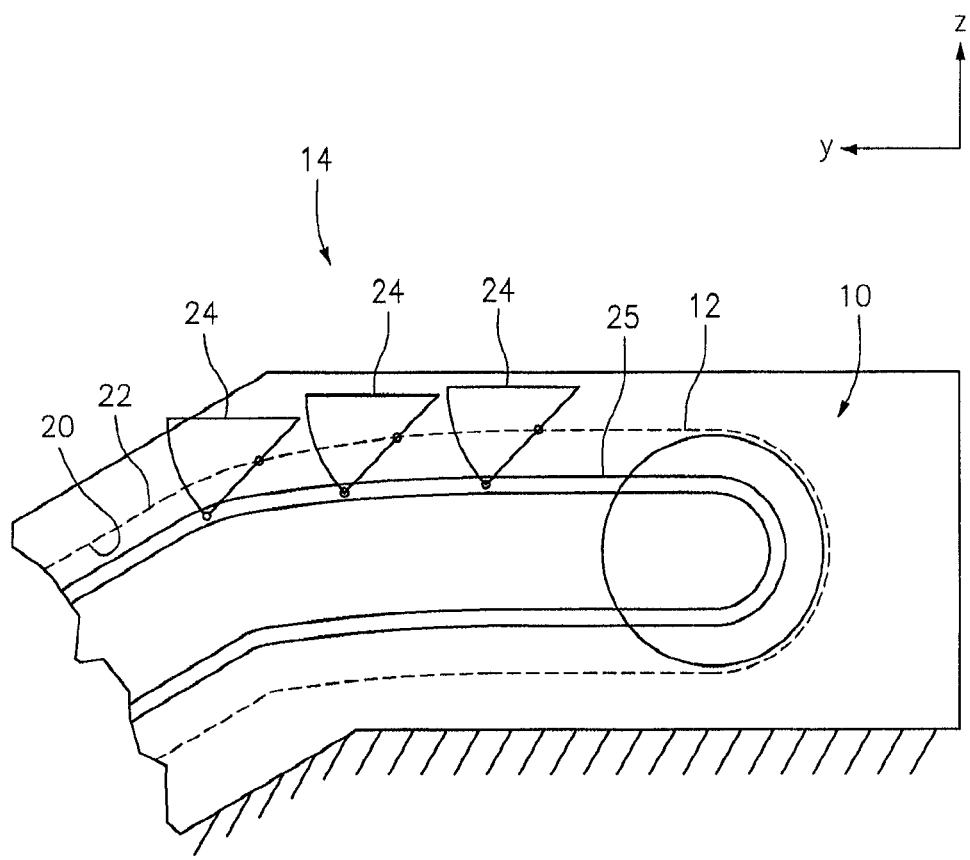
FIG. 2 is a schematic elevation view of the escalator system of FIG. 1.

Referring to FIGS. 1 and 2, the present disclosure describes embodiments of a drive system 10 that is operable to drive a conveyor band 12. The present disclosure describes aspects of the present invention with reference to the embodiment illustrated in the drawings; however, aspects of the present invention are not limited to the embodiment illustrated in the drawings. The present disclosure may describe a feature as having a length extending relative to a x-axis, a width extending relative to a y-axis, and/or a height extending relative to a z-axis. The drawings illustrate the respective axes.

Figure 3:
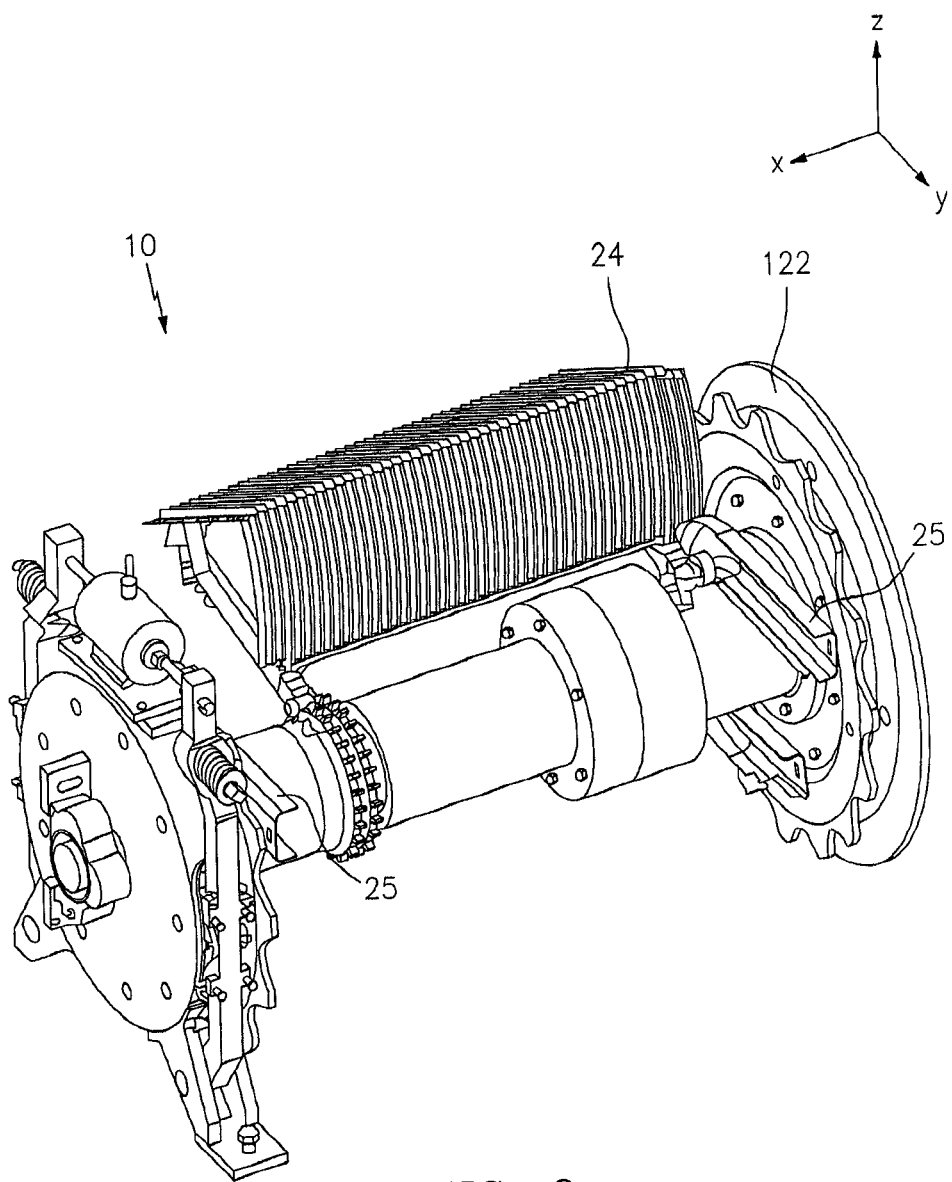
FIG. 3 is a perspective view of the drive system of FIG. 1.

The drive system 10 can be used to drive various types of conveyor bands 12. In some embodiments, the conveyor band 12 is a passenger conveyance band (e.g., a moving sidewalk band, an escalator step band) that is included in a passenger conveyance system (e.g., a moving sidewalk system, an escalator system). In the embodiment illustrated in FIGS. 1 and 2, the conveyor band 12 is an escalator step band that is included in an escalator system 14. For ease of description, the conveyor band 12 will be referred to hereinafter as the "escalator step band 12". In the embodiment illustrated in FIGS. 1 and 2, the escalator step band 12 includes a first side edge 16 and an opposing second side edge 18; a first end (not shown) and a second end (not shown) that are connected together so that the escalator step band 12 forms a continuous loop; an inner side 20 that extends between the first and second side edges 16, 18; and an opposing outer side 22 that extends between the first and second side edges 16, 18. In this embodiment, the inner side 20 of the escalator step band 12 includes structure (not shown) that the drive system 10 engages to drive the escalator step band 12, and the outer side 22 of the escalator step band 12 includes structure (not shown) that enables a plurality of escalator steps to be attached thereto. FIG. 2 illustrates the escalator steps 24 relative to the escalator step band 12. FIG. 3 omits the escalator step band 12, but illustrates an escalator step 24 relative to the drive system 10. In some embodiments, including the embodiments illustrated in FIGS. 2 and 3, the escalator system 14 includes elevator step guide rails 25, and each escalator step 24 includes structure (not shown) that is operable to engage the elevator step guide rails 25 to aid in positioning the escalator step 24.

Figure 4:
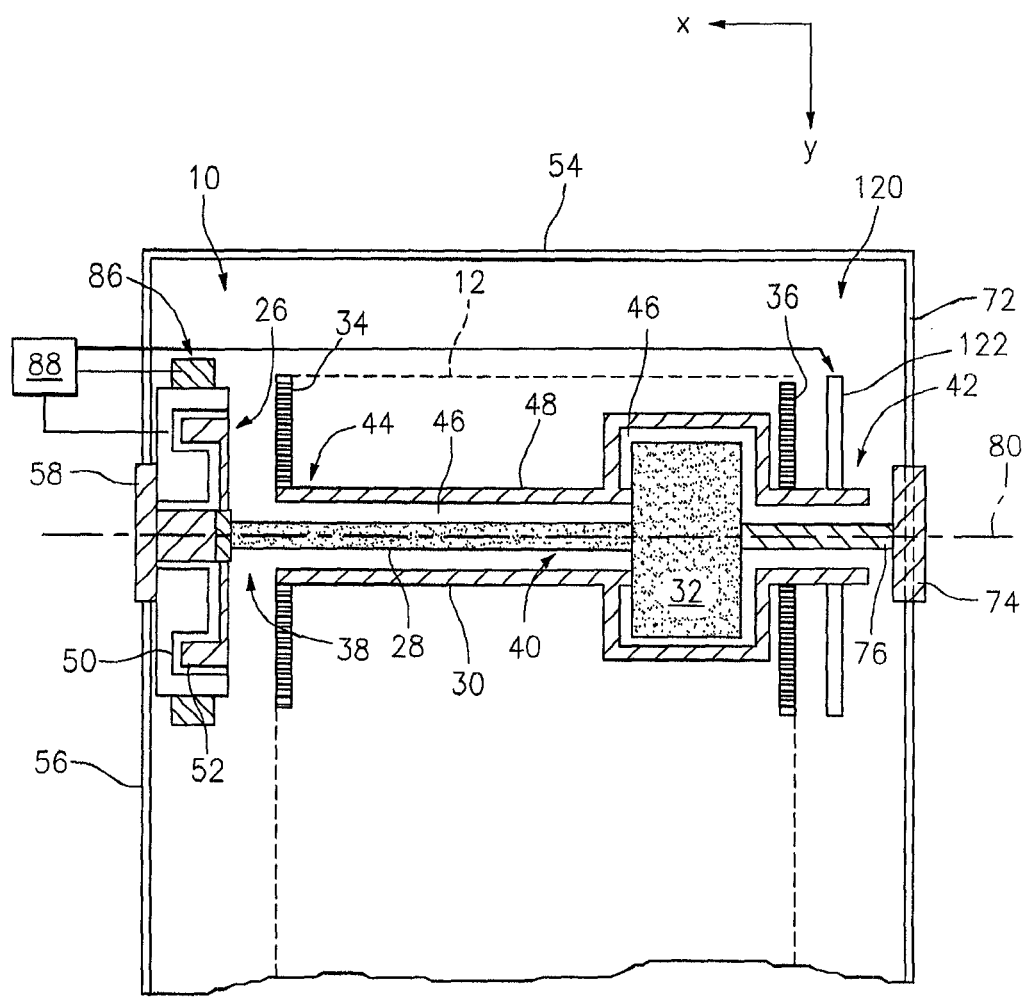
FIG. 4 is a more detailed schematic plan view of the escalator system of FIG. 1.

Referring to FIG. 4, the drive system 10 includes a drive motor 26, an inner drive shaft 28, an outer drive shaft 30, a gearbox 32, and one or more band engagement members 34, 36 (e.g., sprockets). The inner drive shaft 28 includes a first end 38 and an opposing second end 40, and the outer drive shaft 30 includes a first end 42 and an opposing second end 44. The outer drive shaft 30 also includes a cavity 46 that extends through at least a portion of the outer drive shaft 30 in a direction between the first and second ends 42, 44 of the outer drive shaft 30. The inner drive shaft 28 is positioned relative to the outer drive shaft 30 such that at least a portion of the inner drive shaft 28 is positioned within the cavity 46 of the outer drive shaft 30, and such that the first end 38 of the inner drive shaft 28 is proximate the second end 44 of the outer drive shaft 30. The gearbox 32 includes an input portion and an output portion that are in geared connected with one another. The drive motor 26 is connected to the first end 38 of the inner drive shaft 28. The second end 40 of the inner drive shaft 28 is connected to the input portion of the gearbox 32. The outer drive shaft 30 is connected to the output portion of the gearbox 32. The band engagement members 34, 36 (e.g., sprockets) are connected to the outer drive shaft 30 such that they extend radially outward from an outer surface 48 of the outer drive shaft 30. The band engagement members 34, 36 are operable to engage the escalator step band 12 to transfer rotational energy from the outer drive shaft 30 to the escalator step band 12.

The drive system 10 can include various types of drive motors 26. In the embodiment illustrated in FIG. 4, the drive motor 26 is a radial gap type electric motor that includes a stator 50 that is positionally fixed, and a rotor 52 that rotates relative to the stator 50. In this embodiment, the escalator system 14 includes an escalator housing 54 that the drive system 10 is positioned within, and the stator 50 of the drive motor 26 is positionally fixed relative to a first wall 56 of the escalator housing 54 using a first truss member 58 that is connected to the first wall 56. The amount of power output by the drive motor 26 can vary, and can be selected based on one or more characteristics of the drive system 10 (e.g., the mass of the inner and outer drive shafts 28, 30) and/or one or more characteristics of the escalator step band 12 (e.g., the mass of the escalator step band 12). The physical size and shape of the drive motor 26 can vary, and can be selected based on one or more characteristics of the drive system 10, one or more characteristics of the escalator step band 12, and/or one or more characteristics of the system (e.g., the escalator system 14) that the drive system 10 and the escalator step band 12 are included in. In the embodiment illustrated in FIG. 4, for example, the drive motor 26 is a radial gap type electric motor that is selected because it has a relatively small length relative to other types of electric motors that have similar power output. In this embodiment, the relatively small length of the drive motor 26 enables it to be positioned between the first wall 56 of the escalator housing 54 and the escalator step band 12.

The drive system 10 can include various types of inner drive shafts 28 and various types of outer drive shafts 30. In the embodiment illustrated in FIG. 4, the inner drive shaft 28 is generally cylindrical in shape, and the cavity 46 of the outer drive shaft 30 extends between the first and second ends 42, 44 of the outer drive shaft 30. In some embodiments, a first portion of the cavity 46 has a first diameter, and a second portion of the cavity 46 has a second diameter that is greater than the first diameter. In the embodiment illustrated in FIG. 4, for example, the inner drive shaft 28 is positioned within a first portion of the cavity 46 that has a first diameter, and the gearbox 32 is positioned within a second portion of the cavity 46 that has a second diameter that is greater than the first diameter. The positioning of the gearbox 32 within the cavity 46 of the outer drive shaft 30 will be discussed further below. In some embodiments, the cavity 46 of the outer drive shaft 30 has a diameter that is at least substantially the same along the entire length of the outer drive shaft 30.

Figure 5:
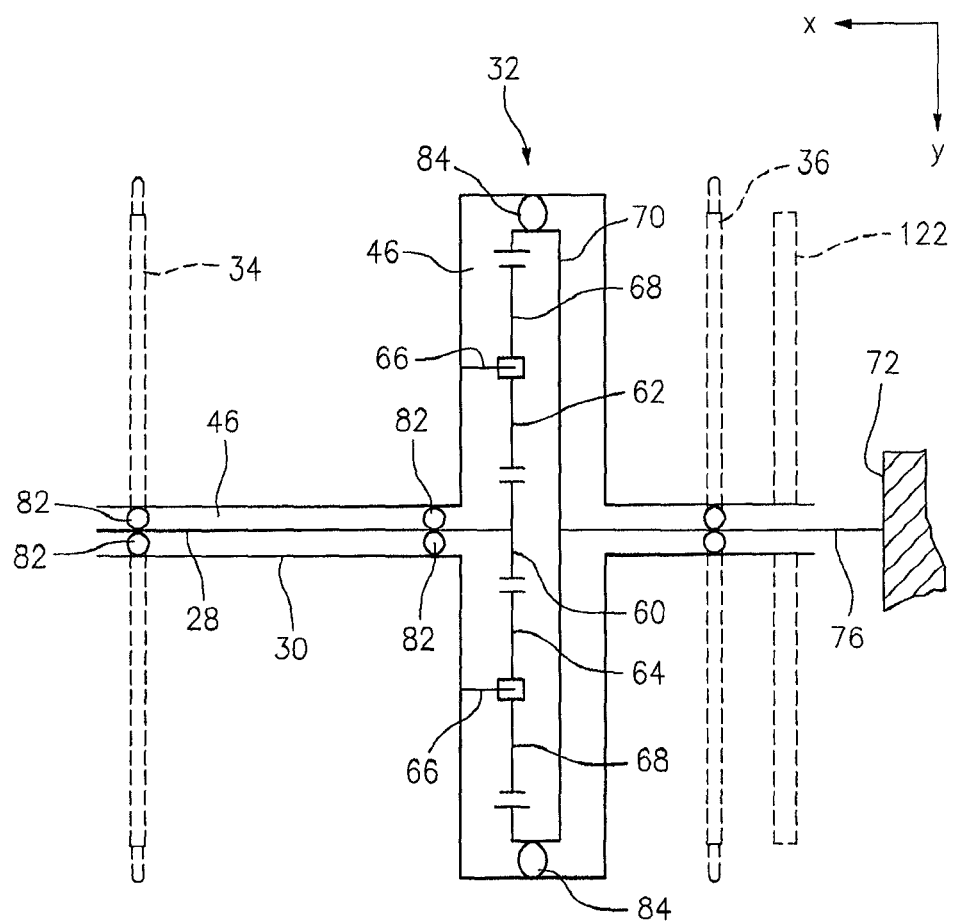
FIG. 5 is a schematic plan view of a portion of the drive system of FIG. 1.

The drive system 10 can include various types of gearboxes 32. In some embodiments, including the embodiment illustrated in FIG. 5, the gearbox 32 is a planetary gearbox that includes a sun gear 60, a plurality of planet gears 62, 64, a planet gear carrier 66, a ring gear 68, and a ring gear carrier 70. In this embodiment, the sun gear 60 is in geared connection with the planet gears 62, 64; the planet gears 62, 64 are in gear connection with the ring gear 68; the planet gear carrier 66 connects the plurality of planet gears 62, 64; and the ring gear carrier 70 is connected to the ring gear 68. In this embodiment, the ring gear carrier 70 is positionally fixed relative to a second wall 72 of the escalator housing 54 that is positioned opposite the first wall 56 of the escalator housing 54 (see FIG. 4). In this embodiment, the ring gear carrier 70 is positionally fixed relative to the second wall 72 using a second truss member 74 (see FIG. 4) that is connected to the second wall 72, and a mounting shaft 76 that extends in a lengthwise direction between the ring gear carrier 70 and the second truss member 74. In this embodiment, the input portion of the gearbox 32 is the sun gear 60, and the output portion of the gearbox 32 is the planet gear carrier 66. That is, the second end 40 of the inner drive shaft 28 is connected to the sun gear 60, and the outer drive shaft 30 is connected to the planet gear carrier 66.

The drive system 10 can include various types of band engagement members 34, 36. In the embodiment illustrated in FIG. 4, each of the band engagement members 34, 36 is a sprocket. For ease of description, the band engagement members 34, 36 will be referred to hereinafter as the "sprockets 34, 36". In the embodiment illustrated in FIG. 4, the sprockets 34, 36 each include an annular base portion connected to the outer surface 48 of the outer drive shaft 30, an annular web portion that extends radially outward from the base portion, and a plurality of teeth that extend radially outward from the base portion. In this embodiment, the teeth are operable to engage structure (not shown) on the inner side 20 (see FIG. 2) of the escalator step band 12.

The drive system 10 can be configured in various ways. In some embodiments, including the embodiment illustrated in FIG. 4, the inner and outer drive shafts 28, 30 are concentrically positioned relative to the same lengthwise-extending axis 80. In other embodiments not shown in the drawings, the inner and outer drive shafts 28, 30 are not concentrically positioned relative to the same axis. In some embodiments, the inner drive shaft 28 does not contact the inner surface of the outer drive shaft 30 that defines the cavity 46. In the embodiment illustrated in FIG. 5, for example, a plurality of roller elements 82 are positioned between the inner drive shaft 28 and the inner surface of the outer drive shaft 30 that defines the cavity 46. In other embodiments not shown in the drawings, the inner drive shaft 28 slidably engages the inner surface of the outer drive shaft 30 that defines the cavity 46. In some embodiments, including the embodiment illustrated in FIG. 4, the rotor 52 is concentrically positioned relative to the same lengthwise-extending axis 80 that the inner and outer drive shafts 28, 30 are concentrically positioned relative to. In some embodiments, the gearbox 32 is positioned within the cavity 46 that is defined by the outer drive shaft 30. In the embodiment illustrated in FIG. 5, for example, the inner drive shaft 28 is positioned within a first portion of the cavity 46 that has a first diameter, and the gearbox 32 is positioned within a second portion of the cavity 46 that has a second diameter that is greater than the first diameter. In this embodiment, a plurality of roller elements 84 are positioned within the cavity 46 between the outer drive shaft 30 and the ring gear carrier 70 of the gearbox 32. In some embodiments, the drive motor 26 can be positioned outside of the loop formed by the escalator step band 12. In the embodiment illustrated in FIG. 4, for example, the drive motor 26 is positioned between the first wall 56 of the escalator housing 54 and the y-z plane defined by the first side edge 16 of the escalator step band 12. In other embodiments not shown in the drawings, the drive motor 26 can be positioned within the loop formed by the escalator step band 12. In some embodiments, the drive system 10 includes a plurality of sprockets 34, 36, and the gearbox 32 is positioned between the sprockets 34, 36. In the embodiment illustrated in FIG. 4, for example, the drive system 10 includes a first sprocket 34 and a second sprocket 36, and the gearbox 32 is positioned between the first and second sprockets 34, 36. In other embodiments not shown in the drawings, the drive system 10 includes a plurality of sprockets 34, 36, and the gearbox 32 is not positioned between the sprockets 34, 36. In such embodiments, each of the plurality of sprockets 34, 36 is positioned between the drive motor 26 and the gearbox 32. In some embodiments, the drive system 10 includes a plurality of sprockets 34, 36, and the radially outer surfaces of the sprockets 34, 36 define a generally cylindrically-shaped area that extends between the sprockets 34, 36. In such embodiments, the drive system 10 can be configured such that each escalator step 24 that is attached to the escalator step band 12 is at least substantially disposed within the generally cylindrically-shaped area when the portion of the escalator step band 12 that the respective escalator step 24 is attached to is in engagement with the sprockets 24, 26. That is, in such embodiments, when the portion of the escalator step band 12 that the respective escalator step 24 is attached to is in engagement with the sprockets 24, 26, the respective escalator step 24 will not extend radially beyond the radially outer surfaces of the sprockets 34, 36, or the respective escalator step 24 will extend radially beyond the radially outer surfaces of the sprockets 34, 36 only an insignificant amount. This feature enables the escalator system 14 to be smaller in size than it might otherwise be.

Referring to FIG. 4, in some embodiments, the drive system 10 additionally includes an operation braking device 86, an auxiliary braking device 120, a controller 88, and/or one or more other components.

Figure 6:
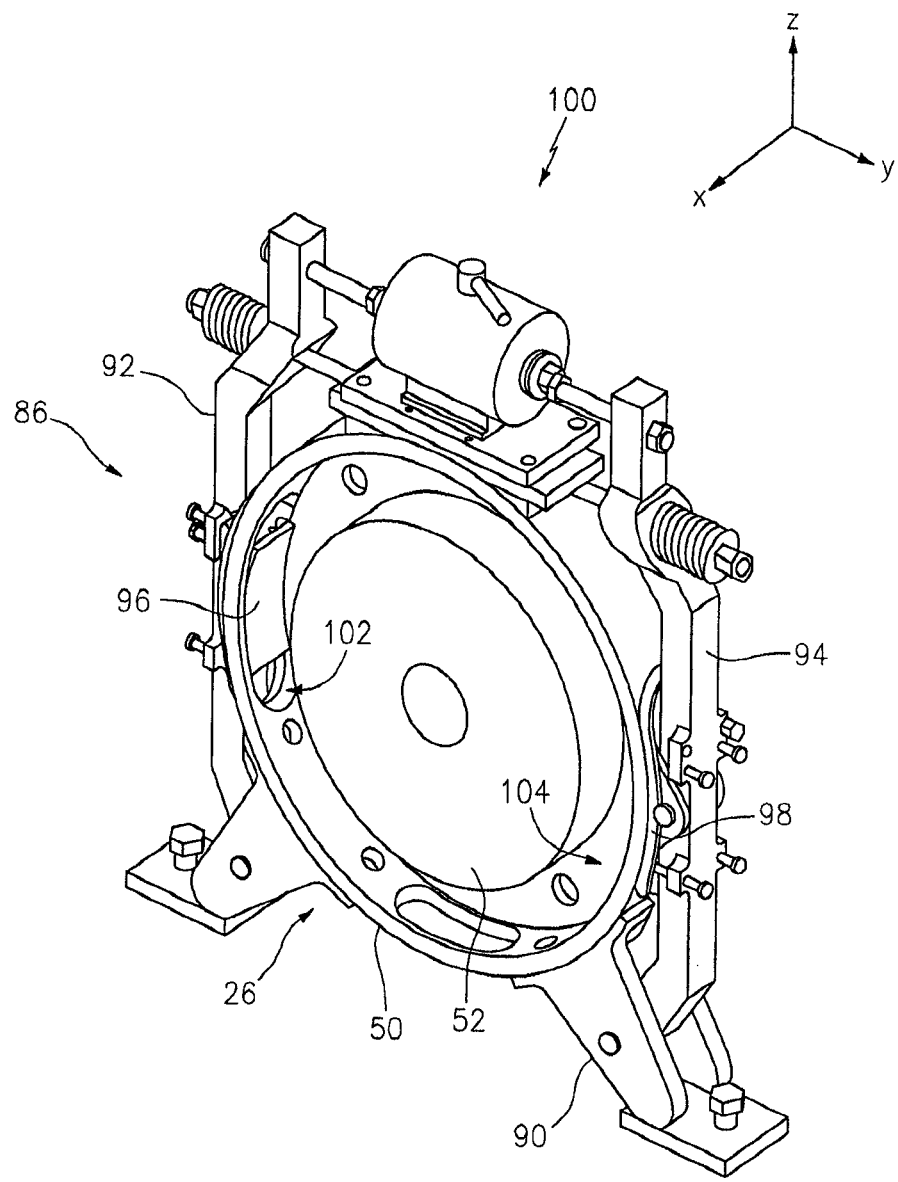
FIG. 6 is a perspective view of the operation braking device included in the drive system of FIG. 1.
Figure 7:
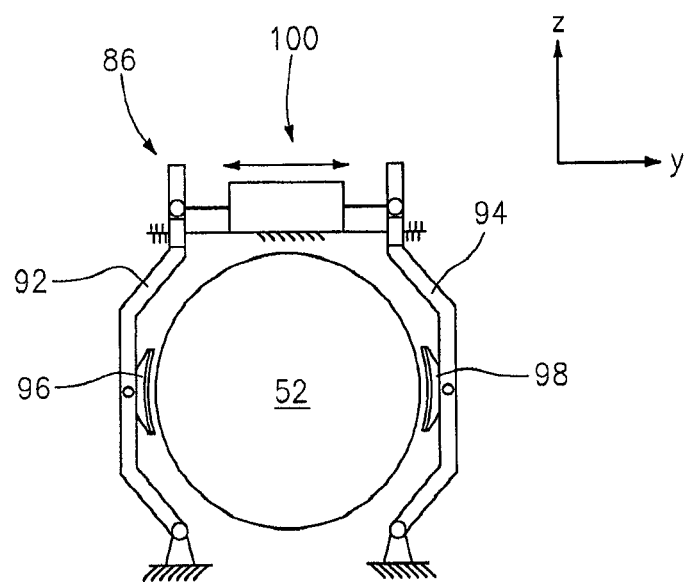
FIG. 7 is a schematic elevation view of the operation braking device of FIG. 6.
Figure 8:
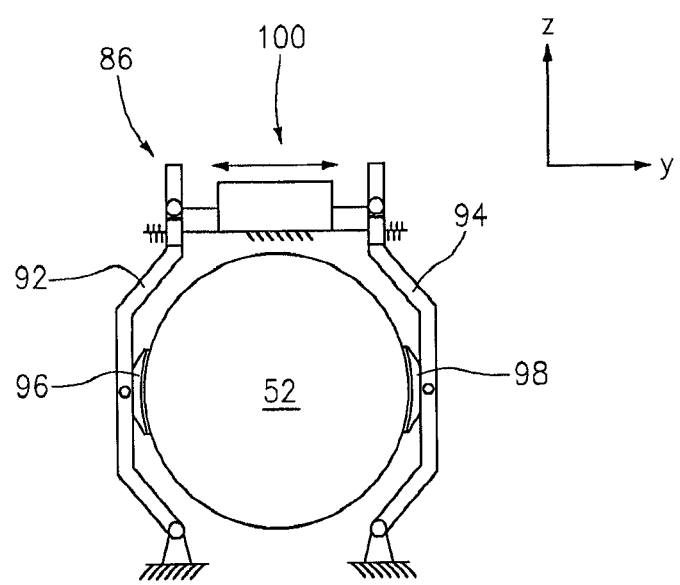
FIG. 8 is a schematic elevation view of the operation braking device of FIG. 6.

In embodiments that include an operation braking device 86, the operation braking device 86 is operable to selectively aid in braking (e.g., slowing and/or stopping movement of) the sprockets 34, 36. The drive system 10 can include various types of operation braking devices 86. In the embodiment illustrated in FIG. 6, the operation braking device 86 includes a mounting structure 90, a first brake arm 92, a second brake arm 94, a first brake shoe 96, a second brake shoe 98, and an actuator 100. In this embodiment, the drive motor 26 includes first and second slots 102, 104 that each extend between the radially outer surface of the rotor 52 and the radially outer surface of the stator 50; the operation braking device 86 is positioned relative to the drive motor 26 such that the first brake shoe 96 extends radially into the first slot 102, and such that the second brake shoe 98 extends radially into the second slot 104; and the first and second brake shoes 96, 98 are selectively moveable between a non-braking position (in which the first and second brake shoes 96, 98 do not contact the outer surface of the rotor 52), and a braking position (in which the first and second brake shoes 96, 98 frictionally engage the outer surface of the rotor 52). In this embodiment, the first brake shoe 96 is connected to the first brake arm 92 and the second brake shoe 98 is connected to the second brake arm 94; the first brake arm 92 includes a first end pivotably connected to the mounting structure 90 and a second end connected to the actuator 100; the second brake arm 94 includes a first end pivotably connected to the mounting structure 90 and a second end connected to the actuator 100; the first and second brake shoes 96, 98 are positioned proximate circumferentially opposite portions of the rotor 52; the mounting structure 90 is positionally fixed relative to the floor of the escalator housing 54 and relative to the stator 50 of the drive motor 26; the actuator 100 is connected to the second ends of the first and second brake arms 92, 94; the actuator 100 is selectively actuatable between a non-braking state (see FIG. 7) and a braking state (see FIG. 8); and the actuator 100 includes a plurality of springs that bias the actuator 100 toward the non-braking state. In this embodiment, when the actuator 100 is actuated from the non-braking state to the braking state, the actuator 100 pulls the second ends of the first and second brake arms 92, 94 towards one another, which overcomes the bias provided by the springs and causes the first and second brake shoes 96, 98 to move from the non-braking position (see FIG. 7) to the braking position (see FIG. 8). In this embodiment, when the first and second brake shoes 96, 98 are in the braking position, they brake the rotor 52, which in turn brakes the sprockets 34, 36. In other embodiments not shown in the drawings, the operation braking device 86 is configured to selectively aid in braking the sprockets 34, 36 by additionally or alternatively braking one or more other components in connection between the drive motor 26 and the input portion of the gearbox 32. In some embodiments, for example, the operation braking device 86 brakes the inner drive shaft 28. In such embodiments, the inner drive shaft 28 may be coated by a liner material and/or may include additional structure that the operation braking device 86 frictionally engages to brake the inner drive shaft 28 without causing wear on the inner drive shaft 28.

Figure 9:
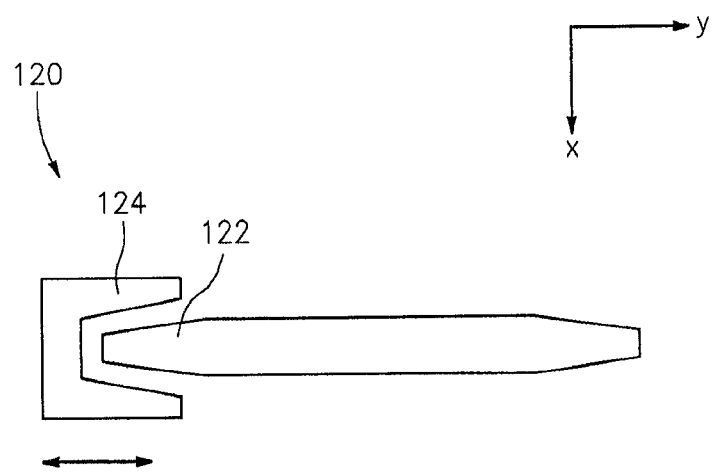
FIG. 9 is a schematic plan view of the operation braking device included in the drive system of FIG. 1.

In embodiments that include an auxiliary braking device 120, the auxiliary braking device 120 is operable to selectively aid in braking the sprockets 34, 36. The drive system 10 can include various types of auxiliary braking devices 120. In the embodiment illustrated in FIG. 9, the auxiliary braking device 120 includes a brake disc 122 and a brake shoe 124 that is selectively moveable (e.g., by an actuator and mounting structure not shown in the drawings) between a non-braking position (in which the brake shoe 124 does not contact the outer surface of the brake disc 122), and a braking position (in which the brake shoe 124 frictionally engages the outer surface of the brake disc 122). In the embodiment illustrated in FIGS. 3-5, the brake disc 122 includes an annular base portion connected to the outer drive shaft 30, and an annular web portion that extends radially between the annular base portion and an outer surface of the brake disc 122; and the brake disc 122 is positioned between the second sprocket 36 and the second wall 72 (see FIGS. 4 and 5) of the escalator housing 54. In other embodiments not shown in the drawings, the brake disc 122 is positioned between the first and second sprockets 34, 36. In the embodiment illustrated in FIGS. 3-5, when the brake shoe 124 is in the braking position, it brakes the outer drive shaft 30, which in turn brakes the sprockets 34, 36. In other embodiments not shown in the drawings, the auxiliary braking device 120 is configured to selectively aid in braking the sprockets 34, 36 by additionally or alternatively braking one or more other components in connection with the output portion of the gearbox 32. In some embodiments, the auxiliary braking device 120 is included in the drive system 10 to comply with certain design codes (e.g., EN115 design codes). In such embodiments, one or more features of the auxiliary braking device 120 may be selected to comply with the design codes.

In some embodiments that include an operation braking device 86 and an auxiliary braking device 120, the gearbox 32 is configured such that the input portion of the gearbox 32 rotates at a significantly higher rate (e.g., RPM) than the output portion of the gearbox 32. In such embodiments, the operation braking device 86 and an auxiliary braking device 120 may be distinguishable from one another in that the operation braking device 86 is operable to brake structures (e.g., the rotor 52, the inner drive shaft 28) that rotate at relatively high rates, whereas the auxiliary braking device 120 is operable to brake structures (e.g., the outer drive shaft 30) that rotate at relatively low rates.

In embodiments that include a controller 88, the controller 88 is operable to selectively control the drive motor 26. In some embodiments that include a controller 88 and one or both of an operation braking device 86 and an auxiliary braking device 120, the controller 88 is operable to selectively control one or more of the drive motor 26, the operation braking device 86, and the auxiliary braking device 120. In the embodiment illustrated in FIG. 4, the controller 88 is electrically connected to the drive motor 26, the operation braking device 86, and the auxiliary braking device 120, and the controller 88 is adapted (e.g., programmed) to selectively provide signals to and/or receive signals from the drive motor 26, the operation braking device 86, and the auxiliary braking device 120 to control the operation of the same. In this embodiment, the controller 88 is adapted to selectively send drive signals to the drive motor 26, the drive signals being operable to cause the rotor 52 to rotate relative to the stator 50 as described above; the controller 88 is adapted to selectively send brake signals to the operation braking device 86, the brake signals being operable to cause the actuator 100 (see FIGS. 6-8) of the operation braking device 86 to actuate from the non-braking state to the braking state as described above; and the controller 88 is adapted to selectively send brake signals to the auxiliary braking device 120, the brake signals being operable to cause the actuator of the auxiliary braking device 120 to move the brake shoe 124 (see FIG. 9) from the non-braking state to the braking state as described above. The functionality of the controller 88 may be implemented using hardware, software, firmware, or a combination thereof. In some embodiments, for example, the controller 88 may include one or more programmable processors. A person having ordinary skill in the art would be able to adapt (e.g., program) the controller 88 to perform the functionality described herein without undue experimentation.

During operation of the drive system 10 illustrated in FIG. 4, the controller 88 selectively sends drive signals to the drive motor 26, which causes the rotor 52 to rotate relative to the stator 50. The rotation of the rotor 52 drives the inner drive shaft 28; the inner drive shaft 28 drives the input portion of the gearbox 32; the input portion of the gearbox 32 drives the output portion of the gearbox 32; the output portion of the gearbox 32 drives the outer drive shaft 30; the outer drive shaft 30 drives the sprockets 34, 36; and the sprockets 34, 36 drive the escalator step band 12. The drive system 10 continuously drives the escalator step band 12 if the controller 88 continuously sends drive signals to the drive motor 26. If the drive system 10 stops sending drive signals to the drive motor 26, the movement of the escalator step band 12 will gradually stop. The movement of the escalator step band 12 can be stopped more quickly if the controller 88 sends brake signals to the operation braking device 86 and/or the auxiliary braking device 120. If the controller 88 sends brake signals to the operation braking device 86, the first and second braking shoes 96, 98 will be moved from the non-braking positions to the braking positions as described above. When the first and braking shoes 96, 98 are in the braking positions, they will brake the rotor 52 of the drive motor 26. The braking of the rotor 52 brakes the sprockets 34, 36, which in turn brakes the escalator step band 12. Similarly, if the controller 88 sends brake signals to the auxiliary braking device 120, the brake shoe 124 will be moved from the non-braking position to the braking positions as described above. When the brake shoe 124 is in the braking position, it brakes the brake disc 122, which in turn brakes the sprockets 34, 36, which in turn brakes the escalator step band 12.

While several embodiments have been disclosed, it will be apparent to those of ordinary skill in the art that aspects of the present invention include many more embodiments and implementations. Accordingly, aspects of the present invention are not to be restricted except in light of the attached claims and their equivalents.

What is claimed is:

1. A drive system that is operable to drive a conveyor band, the drive system comprising:
   a drive motor;
   an inner drive shaft that comprises a first end and a second end, the first end of the inner drive shaft being connected to the drive motor;
   a gearbox that comprises an input portion and an output portion, the input and output portions being in geared connection with one another, and the input portion being connected to the second end of the inner drive shaft;
   an outer drive shaft that comprises a first end, a second end, and a cavity that extends through at least a portion of the outer drive shaft in a direction between the first and second ends, the outer drive shaft being connected to the output portion of the gearbox;
   a band engagement member connected to the outer drive shaft, the band engagement member extending radially outward from an outer surface of the outer drive shaft, and the band engagement member being operable to engage the conveyor band to transfer rotational energy from the outer drive shaft to the conveyor band;
   an operation braking device that is operable to selectively aid in braking the band engagement member; and
   an auxiliary braking device that includes a brake disc and a brake shoe that is selectively moveable between a non-braking position in which the brake shoe does not contact an outer surface of the brake disc and a braking position in which the brake shoe frictionally engages the outer surface of the brake disc;
   wherein the brake disc includes an annular base portion connected to the outer drive shaft; and
   wherein at least a portion of the inner drive shaft is positioned within the cavity of the outer drive shaft.

2. The drive system of claim 1, wherein the band engagement member is a sprocket.

3. The drive system of claim 1, wherein the band engagement member comprises an annular base portion connected to an outer surface of the outer drive shaft, an annular web portion that extends radially outward from the base portion, and a plurality of teeth that extend radially outward from the base portion.

4. The drive system of claim 1, wherein the drive system includes a first band engagement member and a second band engagement member, each being connected to the outer drive shaft, each extending radially outward from an outer surface of the outer drive shaft, and each being operable to engage the conveyor band to transfer rotational energy from the outer drive shaft to the conveyor band.

5. The drive system of claim 4, wherein the conveyor band is an escalator step band onto which a plurality of escalator steps are attached;
 wherein each of the first and second band engagement members is a sprocket, and wherein radially outer surfaces of the first and second band engagement members define a generally cylindrically-shaped area that extends between the first and second band engagement members;
 wherein each of the plurality of escalator steps is at least substantially disposed within the generally cylindrically-shaped area when a portion of the conveyor band that the respective escalator step is attached to is in engagement with the first and second band engagement members.

6. The drive system of claim 1, wherein the inner drive shaft is positioned relative to the outer drive shaft such that the first end of the inner drive shaft is proximate the second end of the outer drive shaft.

7. The drive system of claim 1, wherein the cavity of the outer drive shaft comprises a first portion and a second portion, wherein the first portion has a first diameter and the second portion has a second diameter that is greater than the first diameter.

8. The drive system of claim 7, wherein the inner drive shaft is positioned within the first portion of the cavity and the gearbox is positioned with the second portion of the cavity.

9. The drive system of claim 1, wherein the gearbox is a planetary gearbox that comprises a sun gear, a plurality of planet gears, a planet gear carrier, a ring gear, and a ring gear carrier.

10. The drive system of claim 9, wherein the input portion of the gearbox is the sun gear, and wherein the output portion of the planetary gearbox is the planet gear carrier.

11. The drive system of claim 1, wherein the inner and outer drive shafts are concentrically positioned relative to a first axis.

12. The drive system of claim 11, wherein the drive motor comprises a stator that is positionally fixed, and a rotor that rotates relative to the stator; and
 wherein the rotor is concentrically positioned relative to the first axis.

13. The drive system of claim 1, wherein a distance separates the inner drive shaft from an inner surface of the outer drive shaft that defines the cavity of the outer drive shaft.

14. The drive system of claim 13, wherein a plurality of roller elements are positioned between the inner drive shaft and the outer drive shaft.

15. The drive system of claim 1, further comprising a first band engagement member and a second band engagement member, and wherein the gearbox is positioned between the first and second band engagement members.

16. The drive system of claim 1, further comprising a controller; and
 wherein the operation braking device is operable to selectively aid in braking the band engagement member in response to a brake signal received from the controller.

17. The drive system of claim 1, wherein the drive motor comprises a stator that is positionally fixed, and a rotor that rotates relative to the stator;
 wherein the operation braking device comprises at least one brake shoe disposed relative to the rotor; and
 wherein the operation braking device comprises an actuator that is operable to selectively move the at least one brake shoe between a non-braking position, in which the at least one brake shoe does not contact an outer surface of the rotor, and a braking position, in which the at least one brake shoe frictionally engages the outer surface of the rotor.

18. The drive system of claim 1, wherein the drive motor comprises a stator that is positionally fixed, and a rotor that rotates relative to the stator;
 wherein the operation braking device comprises a first brake shoe and a second brake shoe, the first and second brake shoes being positioned proximate circumferentially opposite portions of the rotor; and
 wherein the operation braking device comprises an actuator that is operable to selectively move the first and second brake shoes between a non-braking position, in which the first and brake shoes do not contact an outer surface of the rotor, and a braking position, in which the first and second brake shoes frictionally engage the outer surface of the rotor.

19. The drive system of claim 1, wherein the operation braking device comprises an actuator that is operable to selectively move a brake shoe between a non-braking position, in which the brake shoe does not contact a component in connection between the drive motor and the input portion of the gearbox, and a braking position, in which the brake shoe frictionally engages the component.

20. The drive system of claim 1, further comprising a controller; and
 wherein the auxiliary braking device is operable to selectively aid in braking the band engagement member in response to a brake signal received from the controller.

21. The drive system of claim 1, wherein the auxiliary braking device comprises an actuator that is operable to selectively move a brake shoe between a non-braking position, in which the brake shoe does not contact a component in connection between the output portion of the gearbox, and a braking position, in which the brake shoe frictionally engages the component.

22. The drive system of claim 1, wherein the drive motor comprises a stator that is positionally fixed and a rotor that rotates relative to the stator, and wherein the operation braking device is operable to brake the rotor and the inner drive shaft.

* * * * *